United States Patent
Eastlake, III et al.

(10) Patent No.: US 10,924,405 B2
(45) Date of Patent: Feb. 16, 2021

(54) SERVICE FUNCTION CHAINING CONGESTION FEEDBACK

(71) Applicant: Futurewei Technologies, Inc., Plano, TX (US)

(72) Inventors: Donald E. Eastlake, III, Milford, MA (US); Andrew G. Malis, Andover, MA (US)

(73) Assignee: Futurewei Technologies, Inc., Plano, TX (US)

( * ) Notice: Subject to any disclaimer, the term of this patent is extended or adjusted under 35 U.S.C. 154(b) by 28 days.

(21) Appl. No.: 15/977,161

(22) Filed: May 11, 2018

(65) Prior Publication Data
US 2019/0268268 A1 Aug. 29, 2019

Related U.S. Application Data

(60) Provisional application No. 62/634,584, filed on Feb. 23, 2018.

(51) Int. Cl.
*H04L 12/801* (2013.01)
*H04L 12/851* (2013.01)
(Continued)

(52) U.S. Cl.
CPC .......... *H04L 47/115* (2013.01); *H04L 43/062* (2013.01); *H04L 47/22* (2013.01); *H04L 47/2483* (2013.01)

(58) Field of Classification Search
CPC ..... H04L 47/115; H04L 43/062; H04L 47/22; H04L 47/2483
See application file for complete search history.

(56) References Cited

U.S. PATENT DOCUMENTS

2012/0106338 A1* 5/2012 Pongracz ............ H04L 47/2441
370/235
2014/0086052 A1 3/2014 Cai et al.
(Continued)

FOREIGN PATENT DOCUMENTS

| CN | 104685919 A | 6/2015 |
| WO | 2013133665 A1 | 9/2013 |
| WO | 2017023741 A1 | 2/2017 |

OTHER PUBLICATIONS

Machine Translation and Abstract of International Publication No. WO2013133665, Sep. 12, 2013, 26 pages.
(Continued)

*Primary Examiner* — Melvin C Marcelo
(74) *Attorney, Agent, or Firm* — Conley Rose, P.C.

(57) ABSTRACT

A method of reporting congestion in an upstream direction in a service chain function architecture. The method includes receiving, by the downstream device, a packet indicating congestion within a service function chaining architecture; generating, by the downstream device, a congestion report message in response to receiving the packet, wherein the congestion report message comprises a field indicating an existence of congestion within the service function chaining architecture and a service path identifier indicating a location of the congestion within the service function chaining architecture; and transmitting, by the downstream device, the congestion report message to an upstream device to permit the upstream device to address the congestion.

18 Claims, 6 Drawing Sheets

(51) Int. Cl.
*H04L 12/26* (2006.01)
*H04L 12/815* (2013.01)

(56) References Cited

U.S. PATENT DOCUMENTS

| | | | |
|---|---|---|---|
| 2016/0065456 A1* | 3/2016 | Muley | H04L 45/38 370/392 |
| 2017/0013502 A1 | 1/2017 | Baniel et al. | |
| 2017/0149665 A1* | 5/2017 | Yousaf | H04L 47/115 |
| 2017/0180218 A1* | 6/2017 | Rasanen | H04L 41/5041 |
| 2019/0260679 A1* | 8/2019 | Eastlake, III | H04L 47/11 |

OTHER PUBLICATIONS

Foreign Communication From a Counterpart Application, PCT Application No. PCT/CN2018/092862, English Translation of International Search Report dated Nov. 15, 2018, 5 pages.
Foreign Communication From a Counterpart Application, PCT Application No. PCT/CN2018/092862, English Translation of Written Opinion dated Nov. 15, 2018, 4 pages.
Ramakrishnan, et al., "The Addition of Explicit Congestion Notification (ECN) to IP," RFC 3168, Sep. 2001, 63 pages.
Briscoe, Ed., et al., "Congestion Exposure (ConEx) Concepts and Use Cases," RFC 6789, Dec. 2012, 17 pages.
Halpern, Ed., et al., "Service Function Chaining (SFC) Architecture," RFC 7665, Oct. 2015, 32 pages.
Fairhurst, et al., "The Benefits of Using Explicit Congestion Notification (ECN)," RFC 8087, Mar. 2017, 19 pages.
Wuinn, Ed., et al., "Network Service Header (NSH)," RFC 8300, Jan. 2018, 40 pages.

\* cited by examiner

SERVICE FUNCTION CHAINING CONGESTION FEEDBACK

CROSS-REFERENCE TO RELATED APPLICATIONS

This patent application claims the benefit of U.S. Provisional Patent Application No. 62/634,584, filed Feb. 23, 2018, by Donald E. Eastlake III, et al., and titled "Service Function Chaining Congestion Feedback," the teaching and disclosure of which is hereby incorporated in its entirety by reference thereto.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A service function chain is composed of a sequence of service function instances that reside within various service node groups. A service function instance (a.k.a., a service node or a service function) may be, for example, a hardware appliance or a software module running on a virtual machine (VM). Each service function instance (e.g., a firewall, Network Address Translation (NAT), etc.), applies a treatment to the packets arriving at the service node and then forwards the packets on to the next service node for treatment.

SUMMARY

In an embodiment, the disclosure includes a method of coding implemented by a coding device. The method includes method of reporting congestion to an upstream device implemented by a downstream device. The method includes receiving, by the downstream device, a packet indicating congestion on a path within a service function chaining architecture; generating, by the downstream device, a congestion report message in response to receiving the packet, wherein the congestion report message comprises a field indicating an existence of congestion within the service function chaining architecture and a service path identifier indicating a location of the congestion within the service function chaining architecture; and transmitting, by the downstream device, the congestion report message to an upstream device to permit the upstream device to alleviate the congestion.

Optionally, in any of the preceding aspects, another implementation of the aspect provides that the packet comprises a plurality of unused bits fields, and wherein at least two of the unused bit fields contain a value to indicate the congestion within the service function chaining architecture. Optionally, in any of the preceding aspects, another implementation of the aspect provides that the value is represented by one or more binary numbers. Optionally, in any of the preceding aspects, another implementation of the aspect provides that the upstream device includes a classifier configured to meter or direct a flow of packets in response to receiving the congestion report message from the downstream device. Optionally, in any of the preceding aspects, another implementation of the aspect provides that the downstream device is an exit node in the service function chaining architecture. Optionally, in any of the preceding aspects, another implementation of the aspect provides that the downstream device is a service function forwarder (SFF) in the service function chaining architecture. Optionally, in any of the preceding aspects, another implementation of the aspect provides that the packet comprises a network service header (NSH) and the congestion report message includes a modified version of the NSH. Optionally, in any of the preceding aspects, another implementation of the aspect provides that the modified version of the NSH identifies a meta data (MD) type, and wherein meta data corresponding to the MD type is structured as one or more fields or type length values (TLVs).

In an embodiment, the disclosure includes a method of reporting congestion to an upstream device implemented by a downstream device in a service function chaining architecture. The method includes receiving, by the downstream device, a packet containing two congestion bits that have been set in a network service header (NSH); generating, by the downstream device, a congestion report message in response to receiving the packet, wherein the congestion report message indicates an existence of congestion on a path within the service function chaining architecture and a location of the congestion within the service function chaining architecture; and transmitting, by the downstream device, the congestion report message to an upstream device within the service function chaining architecture, wherein the congestion report message instructs the upstream device address the congestion.

Optionally, in any of the preceding aspects, another implementation of the aspect provides that the existence of the congestion is indicated by manipulating at least one field in the NSH of the packet and including the at least one field in the congestion report message when generated. Optionally, in any of the preceding aspects, another implementation of the aspect provides that the location of the congestion is indicated by manipulating a service path identifier in the NSH of the packet and including the service path identifier as manipulated in the congestion report message when generated. Optionally, in any of the preceding aspects, another implementation of the aspect provides that the downstream device is an exit node in the service function chaining architecture. Optionally, in any of the preceding aspects, another implementation of the aspect provides that the downstream device is a service function forwarder (SFF) in the service function chaining architecture.

In an embodiment, the disclosure includes an upstream device in a service function chaining architecture. The upstream device includes a memory comprising instructions; a processor in communication with the memory, wherein the processor executes the instructions to: transmit a packet to a downstream device, wherein the packet is configured to indicate congestion on a path within the service function chaining architecture; receive a congestion report message from the downstream device in response to transmission of the packet, wherein the congestion report message comprises a field indicating an existence of congestion within the service function chaining architecture and a service path identifier indicating a location of the congestion within the service function chaining architecture; and alleviate the congestion identified in the congestion report message.

Optionally, in any of the preceding aspects, another implementation of the aspect provides that the packet comprises a plurality of unused bits fields, and wherein at least two of the unused bit fields contain a value to indicate the congestion within the service function chaining architecture.

Optionally, in any of the preceding aspects, another implementation of the aspect provides that the value is represented by one or more binary numbers. Optionally, in any of the preceding aspects, another implementation of the aspect provides that the processor executes the instructions to meter or direct a flow of packets in response to receiving the congestion report message from the downstream device. Optionally, in any of the preceding aspects, another implementation of the aspect provides that the downstream device is an exit node in the service function chaining architecture. Optionally, in any of the preceding aspects, another implementation of the aspect provides that the downstream device is a service function forwarder (SFF) in the service function chaining architecture.

Optionally, in any of the preceding aspects, another implementation of the aspect provides that the packet comprises a network service header (NSH) and the congestion report message includes a modified version of the NSH.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
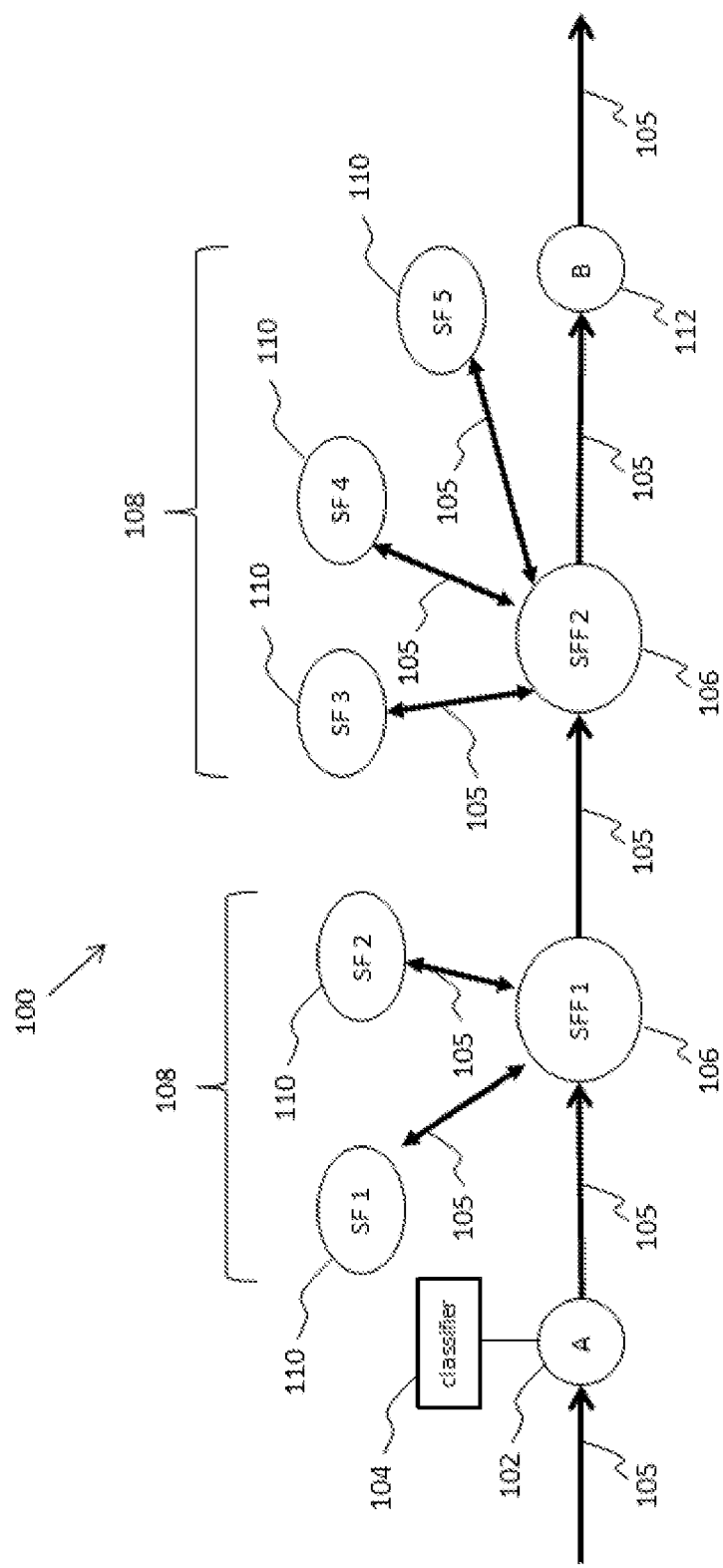
FIG. 1 is a schematic diagram of a service function chaining architecture.

FIG. 1 is a schematic diagram of service function chaining architecture 100. As shown, the service function chaining architecture 100 includes a network device 102 functioning as an ingress node and implementing a classifier 104, one or more network devices 106 functioning as a service function forwarder (SFF), service node groups 108 containing a variety of different service nodes 110, and network device 112 functioning as an exit node. In an embodiment, one or both of network devices 102 and 112 also function as SFFs.

The network device 102, classifier 104, network devices 106, service nodes 110, and network device 112 may communicate through wired connections, wireless connections, or some combination thereof, collectively referred to herein as a link 105. Those skilled in the art will appreciate that other devices and/or elements may be included in the service function chaining architecture 100 in practical applications. However, for the sake of brevity, these additional devices and/or elements will not be described in detail.

The network device 102, which may be referred to as an ingress node, is configured to receive a packet (e.g., data packet, etc.) from a traffic source (not shown). The traffic source may store or be configured to obtain media and/or content such as, for example, images, videos, data files, etc. The traffic source may transmit the media and/or content in the form of individual packets that, when assembled, represent the media or content. The traffic source may be, for example, a server, router, gateway, or other network element configured to provide or transmit packets to the network device 102.

As shown, the network device 102 may have the classifier 104 implemented thereon. In other circumstances, the classifier 104 may be disposed on a device separate from the network device 102. In addition, in some cases one classifier 104 may be shared by several network devices 102. As will be more fully explained below, the classifier 104 of the network node 102 is configured to add, for example, a network service header (NSH) and the network device 112 is configured to remove the NSH.

The classifier 104 may be, for example, software installed on the network device 102. In some cases, the classifier 104 is software installed on the network device 102 by, or at the direction of, a service chain orchestrator (not shown). The service chain orchestrator may be, for example, a software-defined network (SDN) controller, a server (e.g., a rack server), or other network element configured to manage network traffic transmitted through the service function chaining architecture 100 from the network device 102 to the network device 112.

The classifier 104 is configured to determine which service node 110 or which service nodes 110 should be applied to each packet received by the network device 102. In other words, the classifier 104 selects the packet flows to be serviced by the service chain and determines how to route the packets between the service node groups 108. The classifier 104 is able to do this by, for example, adding a service chain header to each incoming packet. The information in the service chain header indicates to the network device 106 which of the service nodes 110 will be applied to each packet and the network device 106 forwards the packet accordingly. For example, the network device 106 may transmit the packet to the particular service node group 108 having the service node or nodes 110 to be applied to the packet based on the information in the packet header.

Each service node group 108 is operably coupled to one of the network devices 106. The service node group 108 may be, for example, a hardware application or a software module running on a virtual machine (VM). In addition, the service node group 108 may be, for example, a data center. As shown, the service node group 108 includes a variety of service nodes 110 (a.k.a., service function instances) of a different type or having different functionalities. Each service node 110 in the service node group 108 is configured to apply a service function (SF). For example, one of the service node groups 108 might include an intrusion detection service (IDS), an intrusion protection service (IPS), a firewall (FW), and network address translation (NAT) function. Another of the services nodes 108 might include a cache, a load balancer (LB), a Quality of Service (QoS) function, a wide area network (WAN) optimizing controller (WOC), and a virtual private network (VPN) function. Those skilled in the art will appreciate that other service nodes 110 may be found in other service node groups 108 in practical applications.

In the service function chaining architecture 100 of FIG. 1, the service nodes 110 in each service node group 108 are implemented sequentially. Because the service nodes 110 are implemented in order, the service nodes 110 form what is referred to as a service function chain. Each service node 110 in the service node group 108 applies its treatment to the packet. After the packet has been treated by the service nodes 110 in an initial service node group 108, the packet is forwarded on to a next service node group 108 to obtain further treatment from the service nodes 110 in that next service node group 108. When no further service node groups 108 remain, the packet is transmitted toward the network device 112.

As an example, the classifier 104 in the network device 102 adds an NSH and then transmits a packet to the network device 106 labeled SFF1. An example NSH is described in the Internet Engineering Task Force (IETF) document Request for Comments (RFC) 8300 entitled "Network Service Header (NSH)" by P. Quinn, Ed., et al., published January 2018, which is incorporated herein by reference. The network device 106 labeled SFF1 sends the packet into the service node group 108 so that SF1 (e.g., an IDS) may be applied at the service node 110 labeled SF1. The treated packet is then returned back to the network device 106 labeled SFF1. Next, the network device 106 labeled SFF1 may then send the packet back to the service group 108 so that SF2 (e.g., an IPS) may be applied. The treated packet is then returned back to the network device 106 labeled SFF1. This process continues until the services or treatments in the service node group 108 have been applied to the packet as specified in the service function chain. Thereafter, the network device 106 labeled SFF1 transmits the packet to the network device 106 labeled SFF2.

The network device 106 labeled SFF2 sends the packet into the service node group 108 so that SF3 (e.g., a FW) may be applied at the service node 110 labeled SF3. The treated packet is then returned back to the network device 106 labeled SFF2. Next, the network device 106 labeled SFF2 may then send the packet back to the service group 108 so that SF4 (e.g., a NAT) may be applied at the service node 110. The treated packet is then returned back to the network device 106 labeled SFF2. Next, the network device 106 labeled SFF2 may then send the packet back to the service group 108 so that SF5 (e.g., a LB) may be applied at the service node 110. The treated packet is then returned back to the network device 106 labeled SFF2. This process continues until the services or treatments in the service node group 108 have been applied to the packet as specified in the service function chain. Thereafter, the network device 106 labeled SFF2 sends the packet on to the network device 112, which removes the NSH that was added by network device 102. The fully treated packet may then be transmitted to, for example, a customer or destination.

In some cases, packets may experience congestion when progressing from the network device 102 to the network device 112. A procedure exists to signal downstream nodes to inform them of the congestion. The procedure is described in the Internet Engineering Task Force (IETF) document Request for Comments (RFC) 3168 entitled "The Addition of Explicit Congestion Notification (ECN) to IP" by K. Ramakrishnan, et al. published September 2001, which is incorporated herein by reference. The procedure can be useful in active queue management as described in IETF document RFC 8087 entitled "The Benefits of Using Explicit Congestion Notification (ECN)" by G. Fairhurst, et al. published March 2017, which is incorporated herein by reference. However, there is presently no procedure for a downstream device (e.g., network device 112 or network device 106) to signal an upstream device (e.g., the network device 102 implementing the classifier 104) in a service function chaining architecture.

Disclosed herein is a method of sending a congestion report message from a downstream device to an upstream device. As will be more fully explained below, upon receiving the congestion report message the upstream device may take steps to alleviate congestion such as, for example, metering the packet traffic or directing future traffic to different service function instances performing the same sequence of services. In an embodiment, the congestion report message may request or instruct the upstream device to alleviate the congestion.

Figure 2:
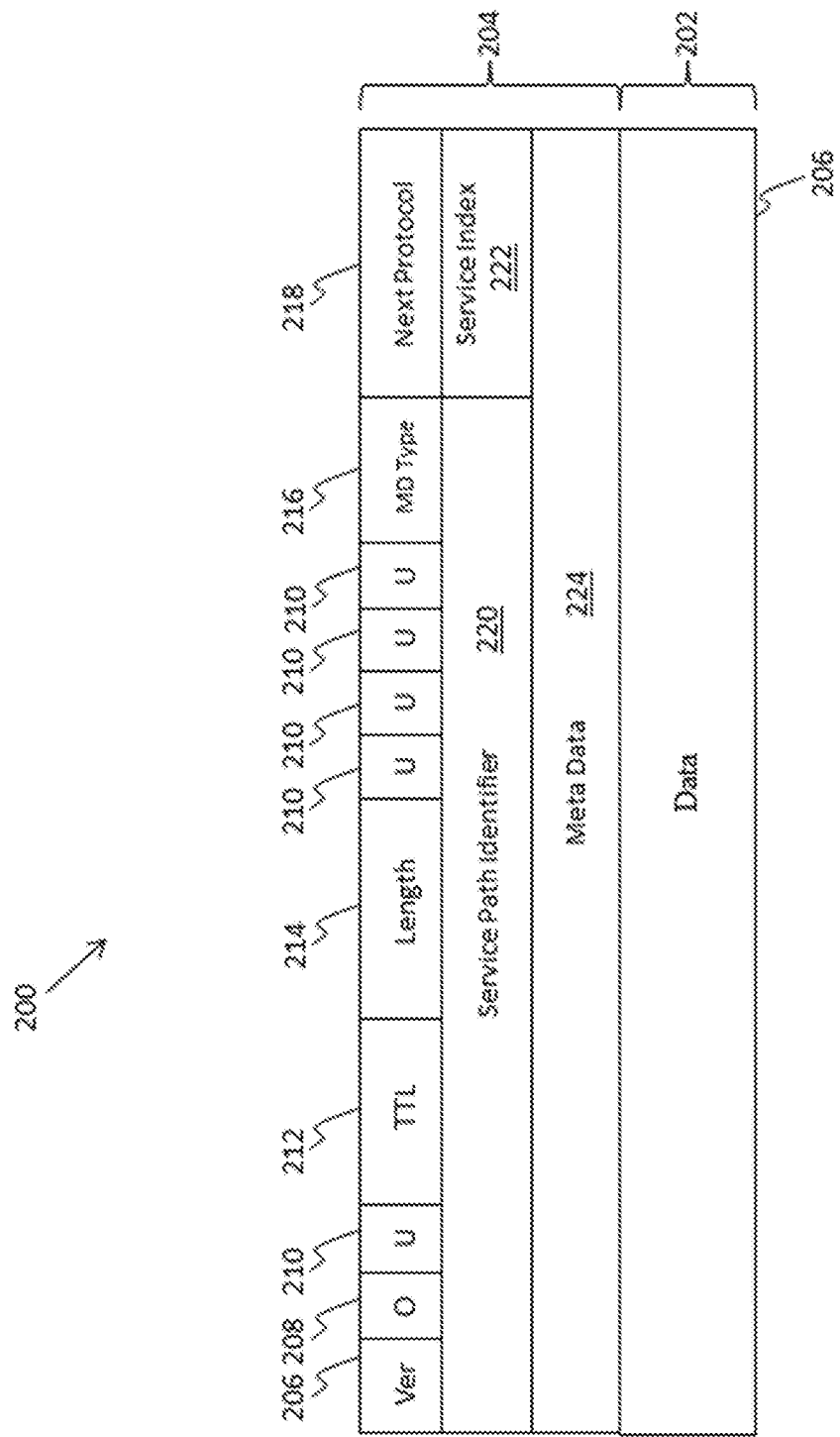
FIG. 2 is a schematic diagram of an embodiment of a packet transmitted from an upstream device to a downstream device.

FIG. 2 is a schematic diagram of an embodiment of a packet 200 transmitted from an upstream device to a downstream device (e.g., from the network device 102 implementing the classifier 104 to network device 112, from network device 106 labeled SFF2 to network device 112, etc.). As shown, the packet 200 includes a data portion 202 and a NSH 204. In practical applications, the packet 200 may also include other fields and headers, such as a transport header, that have been omitted herein for the sake of brevity. The data portion 202 of the packet 200 includes, for example, the information or data that was requested by the client or customer. Thus, the data portion 202 may include an image, portion of a video, a data file, and so on.

In an embodiment, the network service header 204 includes a variety of different fields such as a version field 206, an operations, administration and management (OAM) field 208, unused bits (U) fields 210, a time to live (TTL) field 212, a length field 214, a meta data (MD) type field 216, a next protocol field 218, a service path identifier field 220, a service index field 222, and a meta data field 224. As will be more fully explained below, the various fields are configured to contain one or more bits. Depending on the value of the bit or bits contained in the particular field, the network device (e.g., network device 112) receiving the packet 200 is provided with information, informed of system parameters, and so on.

The version field 206 is configured to contain one or more bits to indicate the current version of the network service header 204. The OAM field 208 is configured to contain one or more bits to indicate whether the packet 200 is an OAM packet or not. The unused bits fields 210 are configured to contain one or more bits to indicate to a downstream device (e.g., the network device 112) that congestion has been experienced within the service function chaining architecture 100. In an embodiment, two of the unused bits fields 210 are set to provide the congestion indication to the downstream device.

The TTL field 212 is configured to contain one or more bits to indicate the number of hops that can be made. The value of the TTL field 212 is decremented each time the packet 200 is received by another network device. If the value of the TTL field 212 is decremented to zero, then the packet 200 is discarded. The length field 214 is configured to contain one or more bits to indicate the length of the network service header 204. The MD type field 216 is configured to contain one or more bits to indicate the meta data type. The next protocol field 218 is configured to contain one or more bits to indicate the next protocol. For example, the next protocol may be a transmission control protocol (TCP), a user datagram protocol (UDP), an Internet Protocol (IP), and so on.

The service path identifier field 220 (which may also be referred to as a chain path identifier field) is configured to contain one or more bits (e.g., a service path identifier (SPI)) to indicate which service function chain should be applied to the packet 200. For example, when the service path identifier field 220 contains the number 0010, the packet 200 is sequentially treated by a firewall and then a network address translation. As another example, when the service path identifier field 220 contains the number 1011, the packet 200 is sequentially treated by a firewall, then a load balancer, then a quality of service (QoS) function.

The service index field 222 is configured to contain one or more bits which, in conjunction with the service path identifier field 220, indicate the action to be taken by a SFF (e.g., whether to forward the packet to another SF, whether to forward the packet to another SFF, or whether to remove the NSH and egress the packet). The service index field 222 is decremented each time one of the service functions is applied to the packet 200. The meta data field 224 is configured to specify what is included in the meta data portion 224 of the packet 200.

In practical applications, the packet 200 may contain other fields (e.g., Protocol Type, Reserved, etc.) and would be preceded by a transport header as would be recognized by one skilled in the art. However, for the sake of brevity, these other fields are not discussed in detail herein.

As noted above, two of the unused bits fields 210 in the packet 200 may be set to provide a congestion indication to a downstream device such as the network device 112 in FIG. 1. For example, two of the unused bit fields 210 contain a value such as a binary number (e.g., a zero, a one, or some combination thereof). When the network device 112 receives the packet 200 containing two of the unused bits fields 210 that are set, the downstream device 112 is informed that there is congestion within the service function chaining architecture 100.

In response to the notification that congestion exists along the path followed by the packet 200 within the service function chaining architecture 100, a downstream device such as the network device 112 or the network device 106 may generate and transmit a congestion report message to an upstream device such as the network device 102 having the classifier 104. In an embodiment, the congestion report message includes one or more of the same fields included in the packet 200. However, at least one of the fields is manipulated to indicate to the upstream device such as the network device 102 having the classifier 104 that congestion is occurring. For example, at least one of the version field 206, OAM field 208, unused bits (U) fields 210, TTL field 212, length field 214, meta data (MD) type field 216, next protocol field 218, etc., is set, includes a certain value, or is otherwise manipulated to advise the upstream node of congestion.

In an embodiment, the network congestion report message also includes the service path identifier field 220 to indicate to the upstream node where the congestion is taking place. Indeed, by including the service path identifier field 220 in the network congestion report message the upstream device such as the network device 102 having the classifier 104 is able to determine the path in the service function chaining architecture 100 where the congestion is occurring.

Figure 3:
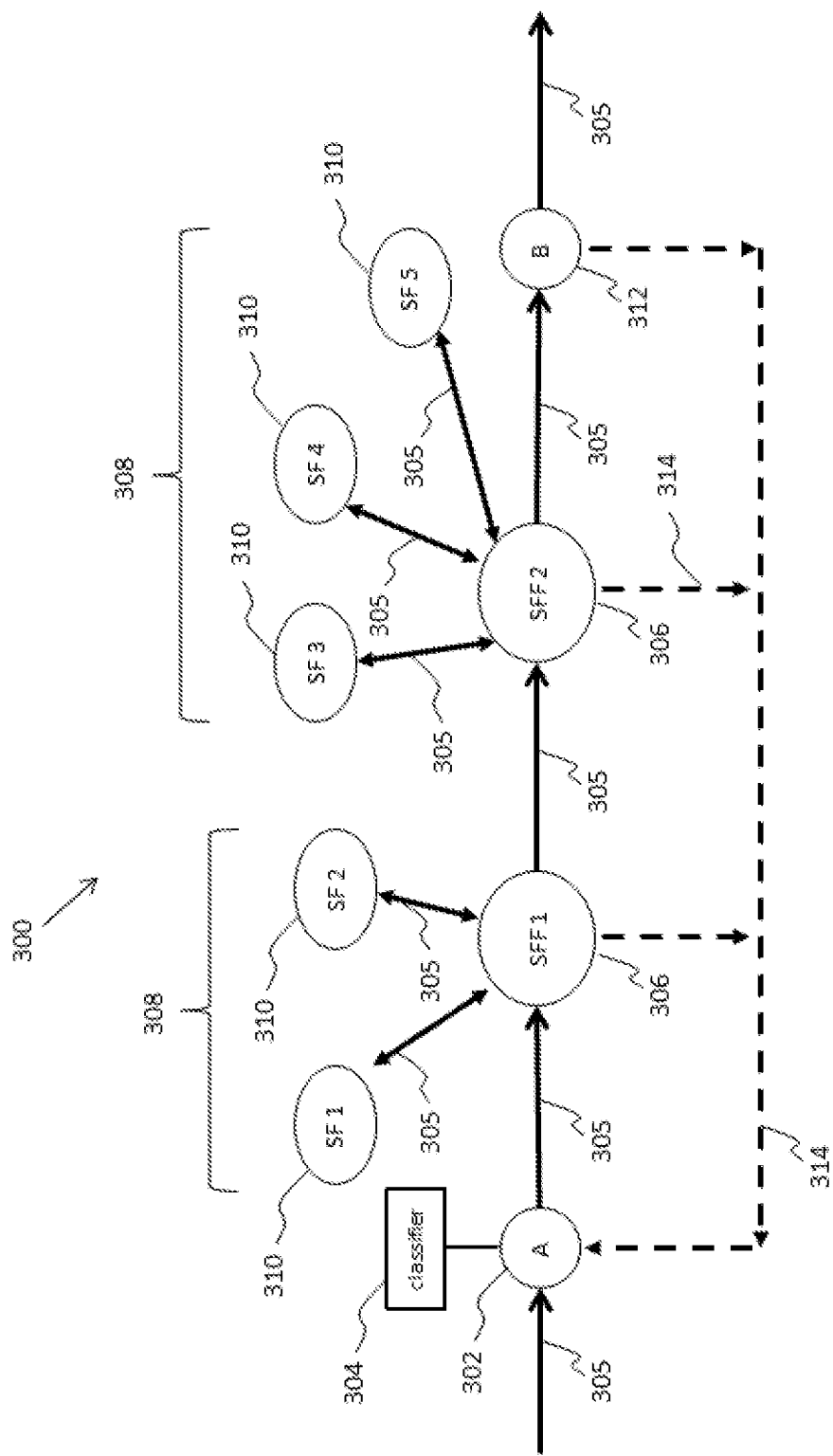
FIG. 3 is a schematic diagram of an embodiment of a service function chaining architecture utilizing a congestion report message.

FIG. 3 is a schematic diagram of service function chaining architecture 300 utilizing a congestion report message. In an embodiment, the service function chaining architecture 300 includes a network device 302 functioning as an ingress node and implementing a classifier 304, one or more network devices 306 functioning as a SFF, service node groups 308 containing a variety of different service nodes 310, a network device 312 functioning as an exit node, and links 305 connecting the devices/nodes to each other.

As shown in FIG. 3, in an embodiment the network congestion report message may be transmitted from a downstream device such as the network device 312 to an upstream device such as the network device 302 having the classifier 304 over a path 314 represented by dashed lines in FIG. 3. In an embodiment, the network congestion report message may be transmitted from a downstream device such as the network device 306 (labeled SFF1 or SFF2) to an upstream device such as the network device 302 over the path 314 having the classifier 304 as represented by dashed lines in FIG. 3. In an embodiment, a network congestion message is sent from an SF node.

It should be appreciated that network device 302 is upstream relative to the network devices 306 (labeled SFF1 or SFF2) and the network device 312. In addition, the network device 306 (labeled SFF1) is downstream of network device 302 and upstream of the network device 306 (labeled SFF2) and the network device 312. The network device 306 (labeled SFF2) is downstream of network device 302 and the network device 306 (labeled SFF1) and upstream of the network device 312. In an embodiment, the network device 302 functions as both an ingress node and an upstream node. In an embodiment, the network device 312 functions as both an exit node and a downstream node. In an embodiment, each of the network devices 306 may be referred to as an intermediate node or an internal node.

In response to receiving the network congestion report message from a downstream device, the classifier 304 of the network device 302 is able to take action to alleviate the congestion. For example, the classifier 304 can turn on metering to reduce the number of packets being sent over a particular path or through the service function chaining architecture 300. In an embodiment, the classifier 304 may attempt to reduce, alleviate, or prevent the traffic congestion. For example, the classifier 304 may use a different SPI that directs packets through different instances of the SFs, probably connected to different SFFs, so that the packet goes through the same SFs in the same order, just different instances of those SFs connected to different SFFs or the like.

In an embodiment, the network congestion report message may be similar to the packet 200, may include a modified version of the network service header 204, or may be a message with an entirely new format. In an embodiment, meta data in a meta data field of the network congestion report message is structured as one or more time length value (TLVs). One of these TLVs may be configured to convey congestion information from the downstream device to the upstream device. It should be appreciated by those skilled in the art that the network congestion report message may be encoded in a variety of other ways in practical applications.

Figure 4:
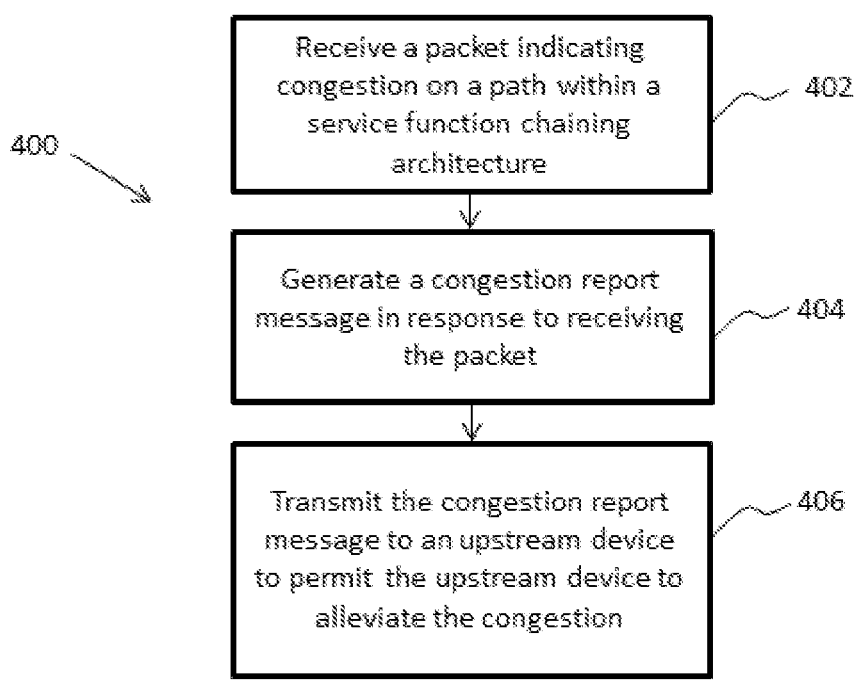
FIG. 4 is an embodiment of a method of reporting congestion to an upstream device implemented by a downstream device.

FIG. 4 is a method 400 of reporting congestion to an upstream device implemented by a downstream device. In an embodiment, the upstream device is similar to the network device 102 in FIG. 1, and the downstream device is similar to the network device 106 or the network device 112 in FIG. 1. The method may be implemented when congestion in the network service architecture is being monitored and reported.

In block 402, the downstream device receives a packet indicating congestion on a path within a service function chaining architecture. The packet may be similar to the packet 200 in FIG. 2. In block 404, the downstream device generates a congestion report message in response to receiving the packet. In an embodiment, the congestion report message contains a field indicating an existence of congestion within the service function chaining architecture and a service path identifier indicating a location of the congestion within the service function chaining architecture. The field may be, for example, the version field 206, OAM field 208, unused bits fields 210, TTL field 212, length field 214, MD type field 216, or next protocol field 218 in the packet 200 of FIG. 2. In block 406, the downstream device transmits the congestion report message to an upstream device to permit the upstream device to address the congestion. In an embodiment, the upstream device is the network device 102 having the classifier 104. Upon receipt of the congestion report message, the upstream device is able to address the congestion. In an embodiment, the congestion report message includes a request or instruction to alleviate or mitigate the congestion.

Figure 5:
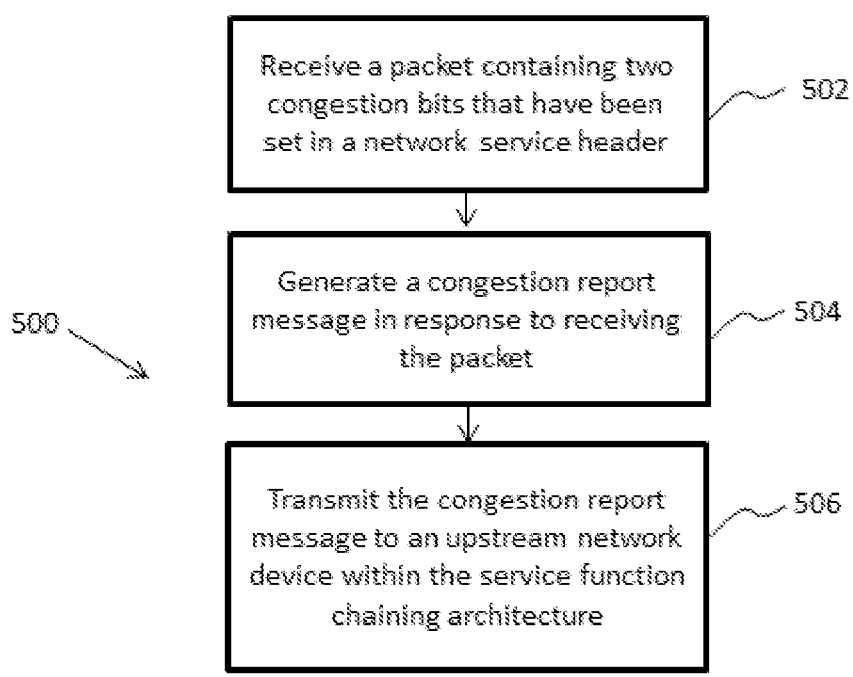
FIG. 5 is an embodiment of a method of reporting congestion to an upstream device implemented by a downstream device in a service function chaining architecture.

FIG. 5 is a method 500 of reporting congestion to an upstream device implemented by a downstream device in a service function chaining architecture. In an embodiment, the upstream device is similar to the network device 102 in FIG. 1, and the downstream device is similar to the network device 106 or the network device 112 in FIG. 1. The method may be implemented when congestion in the network service architecture is being monitored and reported. In block 502, the downstream device receives a packet containing two congestion bits that have been set in a NSH. The packet may be similar to the packet 200 in FIG. 2. In block 504, the downstream device generates a congestion report message in response to receiving the packet. In an embodiment, the congestion report message indicates an existence of congestion within the service function chaining architecture and a location of the congestion within the service function chaining architecture. In block 506, the downstream device transmits the congestion report message to an upstream device within the service function chaining architecture. In an embodiment, the congestion report instructs the upstream device address the congestion.

Figure 6:
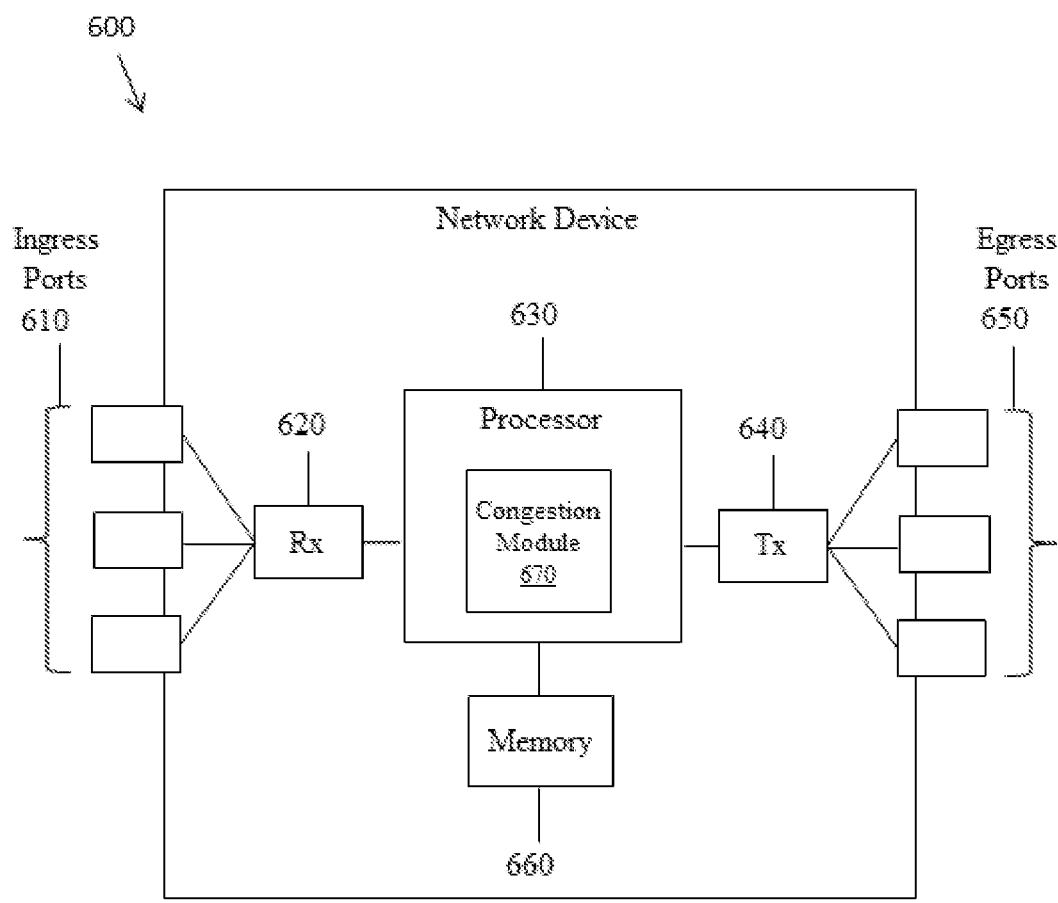
FIG. 6 is a schematic diagram of a network device.

FIG. 6 is a schematic diagram of a network device 600 according to an embodiment of the disclosure. The network device 600 is suitable for implementing the components described herein (e.g., the upstream device 102, the SFFs 106, or the downstream device 112 of FIG. 1). The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

The processor 630 is implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 is in communication with the ingress ports 610, receiver units 620, transmitter units 640, egress ports 650, and memory 660. The processor 630 comprises a congestion module 670. The congestion module 670 implements the disclosed embodiments described above. For instance, the congestion module 670 implements the methods of FIG. 5-6. The inclusion of the congestion module 670 therefore provides a substantial improvement to the functionality of the device 600 and effects a transformation of the device 600 to a different state. Alternatively, the congestion module 670 is implemented as instructions stored in the memory 660 and executed by the processor 630.

The memory 660 comprises one or more disks, tape drives, and solid-state drives and may be used as an overflow data storage device, to store programs when such programs are selected for execution, and to store instructions and data that are read during program execution. The memory 660 may be volatile and non-volatile and may be read-only memory (ROM), random-access memory (RAM), ternary content-addressable memory (TCAM), and static random-access memory (SRAM).

The concepts described in the present disclosure provide numerous advantages. For example, there is currently no solution for providing feedback in a unidirectional service function chain domain. The present disclosure provides a feedback message with the service function chain architecture or domain that can carry congestion information. In a bi-directional service function chain domain, piggybacking feedback information with real data (e.g., data requested by a customer or client) is restricted as to bandwidth and timing and may mandate complex coding. By comparison, an explicit feedback message (e.g., the congestion report message disclosed herein) is straightforward, flexible, and includes room for data being fed back.

A method of reporting congestion to an upstream device implemented by a downstream device. The method includes means for receiving a packet indicating congestion within a service function chaining architecture; means for generating a congestion report message in response to receiving the packet, where the congestion report message c a field indicating an existence of congestion within the service function chaining architecture and a service path identifier indicating a location of the congestion within the service function chaining architecture; and means for transmitting the congestion report message to an upstream device to permit the upstream device to alleviate the congestion.

A method of reporting congestion to an upstream device implemented by a downstream device in a service function chaining architecture. The method includes means for receiving a packet containing two congestion bits that have been set in an NSH; means for generating a congestion report message in response to receiving the packet, where the congestion report message indicates an existence of congestion within the service function chaining architecture and a location of the congestion within the service function chaining architecture; and means for transmitting the congestion report message to an upstream device within the service function chaining architecture, where the congestion report instructs the upstream device to address the congestion.

An upstream device in a service function chaining architecture. The upstream device includes memory means comprising instructions; processor means coupled to the memory means, where the processor means executes the instructions to: transmit a packet to a downstream device, wherein the packet is configured to indicate congestion on a path within the service function chaining architecture; receive a congestion report message from the downstream device in response to transmission of the packet, wherein the congestion report message comprises a field indicating an existence of congestion within the service function chaining architecture and a service path identifier indicating a location of the congestion within the service function chaining architecture; and alleviate the congestion identified in the congestion report message.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for reporting congestion to an upstream device implemented by a downstream device, comprising:
    receiving, by the downstream device from the upstream device, a packet including a first field containing a value notifying the downstream device of congestion on a service function path within a service function chaining architecture and a service path identifier field configured to contain one or more bits that indicate, to the downstream device, service nodes in a service function chain to which the downstream device should apply the packet;
    generating, by the downstream device, a congestion report message in response to receiving, from the upstream device, the packet including the first field and the service path identifier field, wherein the congestion report message includes a modified version of the first field containing the value indicating an existence of the congestion on the service function path within the service function chaining architecture and the service path identifier field, wherein the service path identifier field in the congestion report message includes a service path identifier that specifies the service function path of the congestion within the service function chaining architecture by identifying the service nodes in the service function chain; and
    transmitting, by the downstream device, the congestion report message to the upstream device without allowing for change in the value to permit the upstream device to alleviate the congestion.

2. The method of claim 1, wherein the first field is an unused bits field, the packet comprises a plurality of unused bits fields, and wherein at least two of the unused bits fields contain the value to indicate the congestion within the service function chaining architecture.

3. The method of claim 2, wherein the value is represented by one or more binary numbers.

4. The method of claim 1, wherein the upstream device includes a classifier configured to meter or direct a flow of packets in response to receiving the congestion report message from the downstream device.

5. The method of claim 1, wherein the downstream device is an exit node in the service function chaining architecture.

6. The method of claim 1, wherein the downstream device is a service function forwarder (SFF) in the service function chaining architecture.

7. The method of claim 1, wherein the packet comprises a network service header (NSH) and the congestion report message includes a modified version of the NSH.

8. The method of claim 7, wherein the modified version of the NSH identifies a meta data (MD) type, and wherein meta data corresponding to the MD type is structured as one or more fields or type length values (TLVs).

9. A method for reporting congestion to an upstream device implemented by a downstream device in a service function chaining architecture, comprising:
    receiving, by the downstream device from the upstream device, a packet containing two unused bit fields and a service path identifier field, wherein each of the unused bit fields includes a congestion bit in a network service header (NSH) that has been set to indicate congestion on a service function path within the service function chaining architecture, and wherein the service path identifier field is configured to contain one or more bits that indicate, to the downstream device, service nodes in a service function chain to which the downstream device should apply the packet;
    generating, by the downstream device, a congestion report message in response to receiving, from the upstream device, the packet including the service path identifier field and the congestion bit in the NSH that has been set to indicate congestion, wherein the congestion report message includes the service path identifier field and a modified version of the two unused bit fields each containing the congestion bit to indicate an existence of the congestion on a path within the service function chaining architecture, and wherein the service path identifier field in the congestion report message includes a service path identifier that specifies the service function path of the congestion within the service function chaining architecture by identifying the service nodes in the service function chain; and
    transmitting, by the downstream device, the congestion report message to the upstream device within the service function chaining architecture without allowing for change in each congestion bit, wherein the congestion report message instructs the upstream device to address the congestion.

10. The method of claim 9, wherein the location of the congestion is indicated by manipulating a service path identifier in the NSH of the packet and including the service path identifier as manipulated in the congestion report message when generated.

11. The method of claim 9, wherein the downstream device is an exit node in the service function chaining architecture.

12. The method of claim 9, wherein the downstream device is a service function forwarder (SFF) in the service function chaining architecture.

13. An upstream device in a service function chaining architecture, comprising:
    a memory comprising instructions;

a processor in communication with the memory, wherein the processor executes the instructions to:

transmit a packet to a downstream device, wherein the packet includes an unused bits field and a service path identifier field, wherein the unused bits field is configured to contain a value that indicates congestion on a service function path within the service function chaining architecture, and wherein the service path identifier field is configured to contain one or more bits that indicate, to the downstream device, service nodes in a service function chain to which the downstream device should apply the packet;

receive a congestion report message from the downstream device in response to transmission of the packet that includes the unused bits field and the service path identifier field, wherein the congestion report message includes the service path identifier field and a modified version of the unused bits field containing the value as set by the downstream device that initially transmitted the congestion report message, the value indicating an existence of the congestion on the service function path within the service function chaining architecture, wherein the service path identifier field in the congestion report message includes a service path identifier that specifies the service function path of the congestion within the service function chaining architecture by identifying the service nodes in the service function chain; and alleviate the congestion identified in the congestion report message.

14. The upstream device of claim 13, wherein the value is represented by one or more binary numbers.

15. The upstream device of claim 13, wherein the processor executes the instructions to meter or direct a flow of packets in response to receiving the congestion report message from the downstream device.

16. The downstream device of claim 13, wherein the downstream device is an exit node in the service function chaining architecture.

17. The downstream device of claim 13, wherein the downstream device is a service function forwarder (SFF) in the service function chaining architecture.

18. The downstream device of claim 13, wherein the packet comprises a network service header (NSH) and the congestion report message includes a modified version of the NSH.

* * * * *

UNITED STATES PATENT AND TRADEMARK OFFICE
CERTIFICATE OF CORRECTION

PATENT NO. : 10,924,405 B2  
APPLICATION NO. : 15/977161  
DATED : February 16, 2021  
INVENTOR(S) : Donald E. Eastlake, III et al.

Page 1 of 1

It is certified that error appears in the above-identified patent and that said Letters Patent is hereby corrected as shown below:

On the Title Page

Page 2, Other Publications, Lines 15-16, should read:
Quinn, Ed., et al., "Network Service Header (NSH)," RFC 8300, Jan. 2018, 40 pages.

Signed and Sealed this
Sixteenth Day of March, 2021

Drew Hirshfeld
*Performing the Functions and Duties of the*
*Under Secretary of Commerce for Intellectual Property and*
*Director of the United States Patent and Trademark Office*